(12) United States Patent
Gupta et al.

(10) Patent No.: US 10,929,037 B2
(45) Date of Patent: Feb. 23, 2021

(54) CONVERTING A RAID TO A MORE ROBUST RAID LEVEL

(71) Applicant: International Business Machines Corporation, Armonk, NY (US)

(72) Inventors: Lokesh M. Gupta, Tucson, AZ (US); Matthew G. Borlick, Tucson, AZ (US); Karl A. Nielsen, Tucson, AZ (US); Clint A. Hardy, Tucson, AZ (US); Brian A. Rinaldi, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/442,503

(22) Filed: Jun. 15, 2019

(65) Prior Publication Data
US 2020/0393983 A1 Dec. 17, 2020

(51) Int. Cl.
*G06F 3/06* (2006.01)
*G06F 11/10* (2006.01)

(52) U.S. Cl.
CPC .......... *G06F 3/0632* (2013.01); *G06F 3/0619* (2013.01); *G06F 3/0653* (2013.01); *G06F 3/0689* (2013.01); *G06F 11/1076* (2013.01)

(58) Field of Classification Search
CPC .... G06F 3/0632; G06F 3/0619; G06F 3/0653; G06F 3/0689; G06F 3/0614; G06F 3/061; G06F 3/0611; G06F 3/0613; G06F 3/0616; G06F 3/0617; G06F 11/1076; G06F 11/1092; G06F 11/1088
See application file for complete search history.

(56) References Cited

U.S. PATENT DOCUMENTS 6,516,425 B1 2/2003 Belhadj et al.
6,718,436 B2 4/2004 Kim et al.
(Continued)

FOREIGN PATENT DOCUMENTS

CN 100504795 C 6/2009
CN 101866271 A 10/2010
(Continued)

OTHER PUBLICATIONS

List of IBM Patents or Patent Applications Treated as Related.
(Continued)

*Primary Examiner* — Tracy A Warren
(74) *Attorney, Agent, or Firm* — Nelson and Nelson; Daniel P. Nelson (57) ABSTRACT

A method for converting a redundant array of independent disks (RAID) to a more robust RAID level is disclosed. Such a method identifies, in a data storage environment, higher risk storage drives having a failure risk above a first threshold. The method determines a number of the higher risk storage drives that are contained within a RAID array of the data storage environment. The method determines whether the number exceeds a second threshold. The method also determines whether a destage rate associated with the RAID array is below a third threshold. In the event the number exceeds the second threshold and the destage rate is below the third threshold, the method converts the RAID array to a more robust RAID level. A corresponding system and computer program product are also disclosed.

20 Claims, 10 Drawing Sheets

(56) References Cited

U.S. PATENT DOCUMENTS

| | | |
|---|---|---|
| 7,827,351 B2 | 11/2010 | Suetsugu et al. |
| 8,037,246 B2 | 10/2011 | Igarashi et al. |
| 8,880,801 B1 | 11/2014 | Robins et al. |
| 9,304,860 B2 | 4/2016 | McLean et al. |
| 9,454,423 B2 | 9/2016 | Jacoby et al. |
| 9,710,317 B2 | 7/2017 | Gupta et al. |
| 9,720,758 B2 | 8/2017 | Jacoby |
| 9,854,042 B2 | 12/2017 | Anderson et al. |
| 2009/0037656 A1* | 2/2009 | Suetsugu ............ G06F 11/1096 711/114 |
| 2009/0177918 A1* | 7/2009 | Abali ................. G06F 11/1092 714/6.32 |
| 2012/0096309 A1* | 4/2012 | Kumar .................. G06F 11/00 714/6.22 |
| 2014/0244927 A1* | 8/2014 | Goldberg ............. G06F 3/0646 711/114 |
| 2016/0103624 A1 | 4/2016 | Klemm et al. |
| 2017/0269985 A1 | 9/2017 | Xiao et al. |
| 2017/0364271 A1 | 12/2017 | Han et al. |
| 2018/0284997 A1 | 10/2018 | Dalmatov |

FOREIGN PATENT DOCUMENTS

| | | |
|---|---|---|
| EP | 0726521 B1 | 10/2003 |
| JP | 2006318017 A | 11/2006 |

OTHER PUBLICATIONS

Thomasian, et al., "Analysis of Rebuild Processing in RAID5 Disk Arrays," The Computer Journal Advance Access, Jan. 18, 2007.
Thomasian, "Clustered RAID Arrays and Their Access Costs," Oxford University Press on behalf of the British Computer Society, Aug. 19, 2005.
Pinheiro, et al. "Failure Trends in a Large Disk Drive Population," Proceedings of the 5th USENIX Conference on File and Storage Technologies (FAST'07), Feb. 2007.
"ReclaiMe Free RAID Recovery," available at http://www.freeraidrecovery.com/library/raid-5-6.aspx, Copyright 2009-2019, last accessed Apr. 16, 2019.
"Why You Should Not Use RAID 5 Storage ( But Use RAID 6! )," https://www.youtube.com/watch?v=A2OxG2UjiV4, Sep. 23, 2015.

* cited by examiner

CONVERTING A RAID TO A MORE ROBUST RAID LEVEL

BACKGROUND

Field of the Invention

This invention relates to systems and methods for reducing incidents of data loss in redundant arrays of independent disks.

Background of the Invention

A RAID (i.e., a Redundant Array of Independent Disks) is a storage technology that provides increased storage functions and reliability through redundancy. A RAID is created by combining multiple storage drive components (e.g., disk drives and/or solid state drives) into a logical unit. Data is then distributed across the drives using various techniques, referred to as "RAID levels." The standard RAID levels, which currently include RAID levels 1 through 6, are a basic set of RAID configurations that employ striping, mirroring, and/or parity to provide data redundancy. Each of the configurations provides a balance between two key goals: (1) increasing data reliability and (2) increasing I/O performance.

Currently, the most commonly used RAID levels are RAID-5 and RAID-6, which both utilize block-level striping with distributed parity values. A RAID-5 array is configured to recover from a single drive failure, whereas a RAID-6 array can recover from two simultaneous drive failures. Thus, a RAID-6 array provides more robust and redundant data protection than a RAID-5 array.

In the field, it has been observed that a drive failure combined with a media error causes most incidents of data loss. For example, a drive failure in a RAID-5 array combined with a media error on another storage drive in the array will cause data loss. Although a RAID-5 array will lose data when two storage drives fail at the same time, data loss resulting from a single drive failure along with a media error is the most common. A RAID-6 array, by contrast, will prevent data loss in either of the above-described scenarios due to the additional parity value that RAID-6 utilizes.

In view of the foregoing, what are needed are systems and methods to reduce incidents of data loss in redundant arrays of independent disks. Further needed are systems and methods to provide better reporting and statistics regarding data loss that results from or was prevented by a specific RAID level (e.g., RAID-5, RAID-6, etc.). Such systems and methods may, in certain cases, be used to encourage users to transition to a more robust RAID level (e.g., RAID-6), or provide evidence that a prior transition to a more robust RAID level has prevented data loss.

SUMMARY

The invention has been developed in response to the present state of the art and, in particular, in response to the problems and needs in the art that have not yet been fully solved by currently available systems and methods. Accordingly, embodiments of the invention have been developed to reduce incidents of data loss in redundant arrays of independent disks (RAID s). The features and advantages of the invention will become more fully apparent from the following description and appended claims, or may be learned by practice of the invention as set forth hereinafter.

Consistent with the foregoing, a method for converting a redundant array of independent disks (RAID) to a more robust RAID level is disclosed. Such a method identifies, in a data storage environment, higher risk storage drives having a failure risk above a first threshold. The method determines a number of the higher risk storage drives that are contained within a RAID array of the data storage environment. The method determines whether the number exceeds a second threshold. The method also determines whether a destage rate associated with the RAID array is below a third threshold. In the event the number exceeds the second threshold and the destage rate is below the third threshold, the method converts the RAID array to a more robust RAID level.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage system, a magnetic storage system, an optical storage system, an electromagnetic storage system, a semiconductor storage system, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage system via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention may be described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Figure 1:
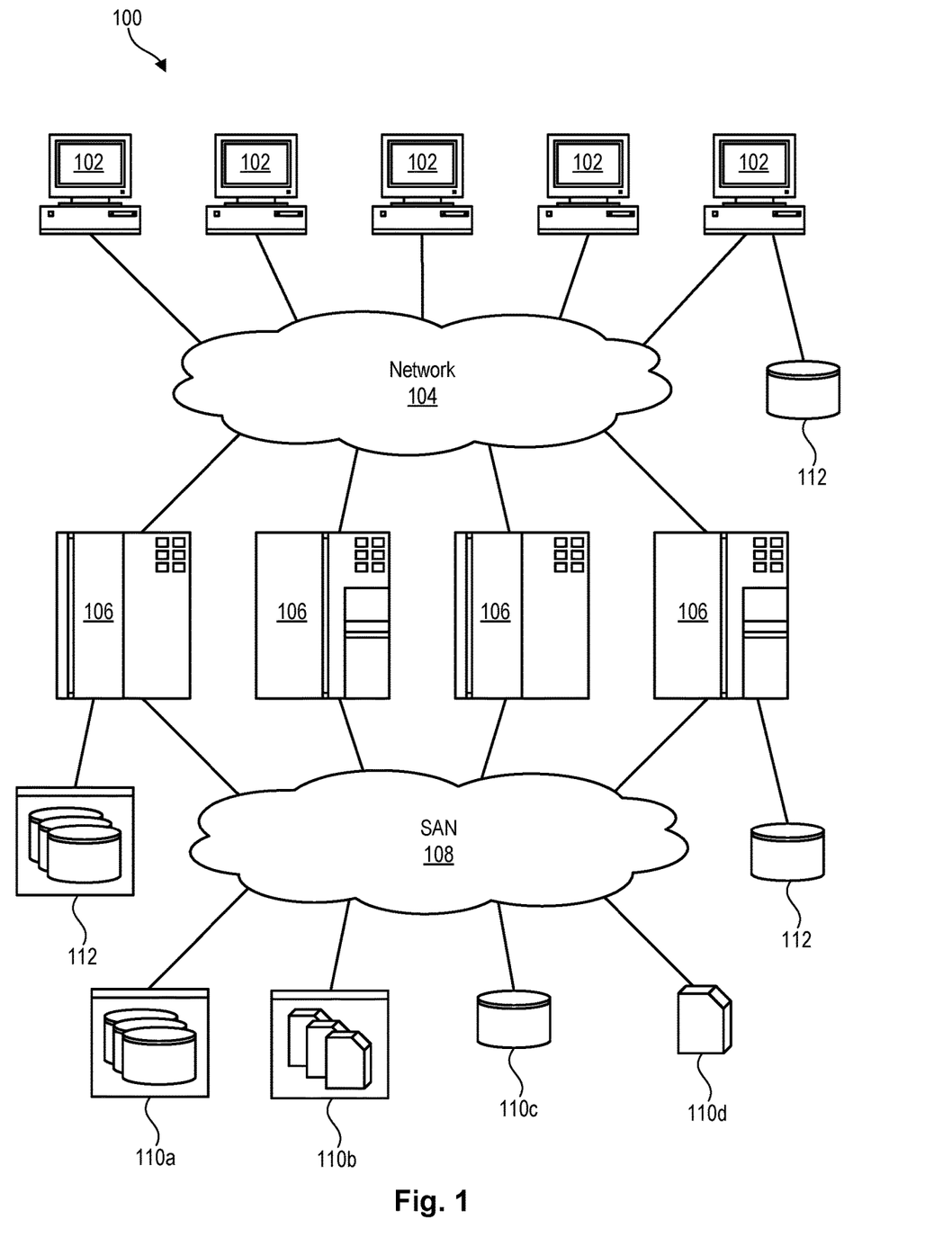
FIG. 1 is a high-level block diagram showing one example of a network environment in which systems and methods in accordance with the invention may be implemented.

Referring to FIG. 1, one example of a network environment 100 is illustrated. The network environment 100 is presented to show one example of an environment where systems and methods in accordance with the invention may be implemented. The network environment 100 is presented by way of example and not limitation. Indeed, the systems and methods disclosed herein may be applicable to a wide variety of different network environments in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "hosts" 106 or "host systems" 106). In general, the client computers 102 initiate communication sessions, whereas the server computers 106 wait for and respond to requests from the client computers 102. In certain embodiments, the computers 102 and/or servers 106 may connect to one or more internal or external direct-attached storage systems 112 (e.g., arrays of hard-storage drives, solid-state drives, tape drives, etc.). These computers 102, 106 and direct-attached storage systems 112 may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as arrays 110a of hard-disk drives or solid-state drives, tape libraries 110b, individual hard-disk drives 110c or solid-state drives 110c, tape drives 110d, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC) or iSCSI.

Figure 2:
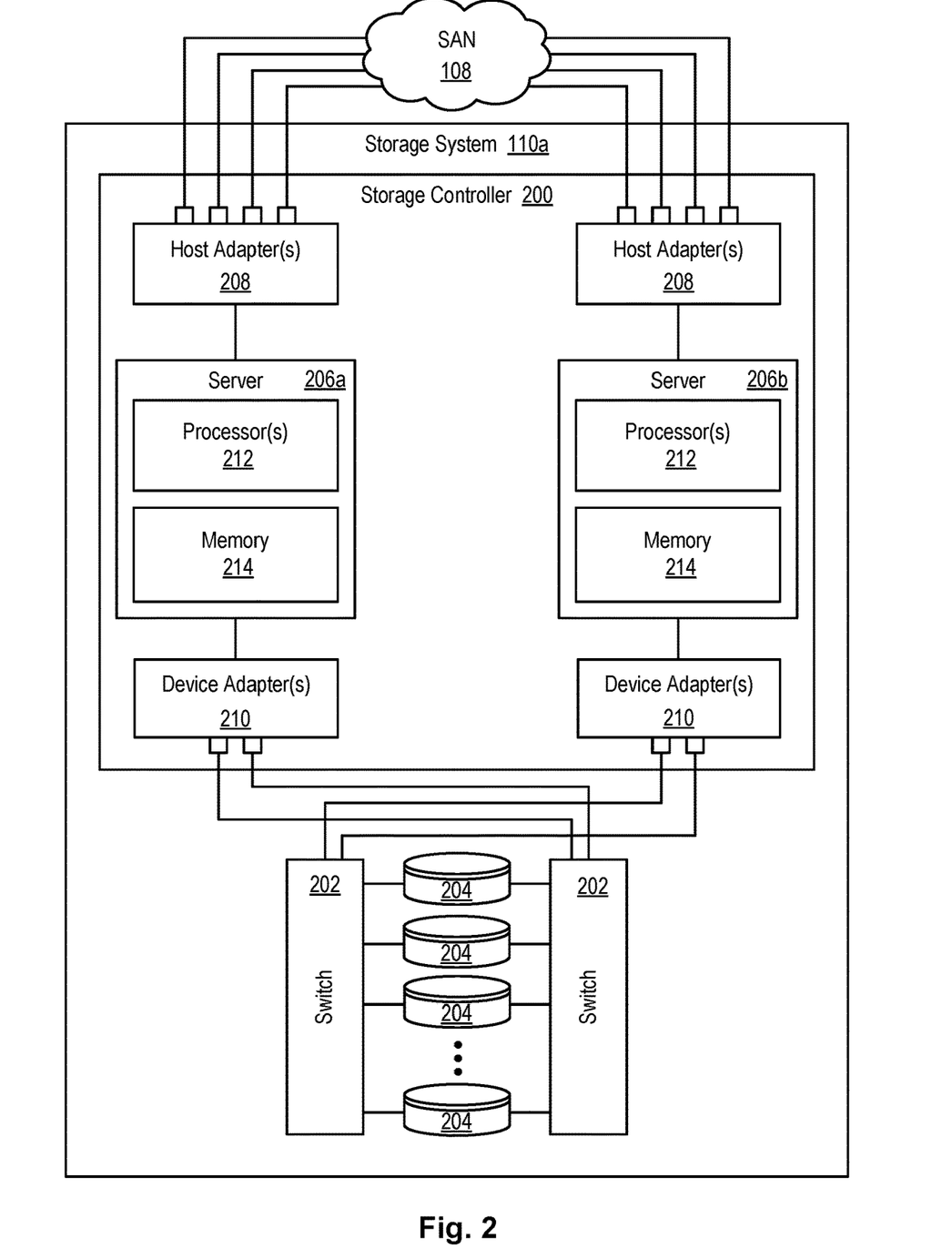
FIG. 2 is a high-level block diagram showing one embodiment of a storage system in which one or more RAIDs may be implemented.

Referring to FIG. 2, one example of a storage system 110a containing an array of hard-disk drives 204 and/or solid-state drives 204 is illustrated. The internal components of the storage system 110a are shown since RAID arrays may, in certain embodiments, be implemented all or partly within such a storage system 110a. As shown, the storage system 110a includes a storage controller 200, one or more switches 202, and one or more storage drives 204, such as hard-disk drives 204 and/or solid-state drives 204 (e.g., flash-memory-based drives 204). The storage controller 200 may enable one or more hosts 106 (e.g., open system and/or mainframe servers 106 running operating systems such z/OS, zVM, or the like) to access data in the one or more storage drives 204.

In selected embodiments, the storage controller 200 includes one or more servers 206. The storage controller 200 may also include host adapters 208 and device adapters 210 to connect the storage controller 200 to host devices 106 and storage drives 204, respectively. Multiple servers 206a, 206b may provide redundancy to ensure that data is always available to connected hosts 106. Thus, when one server 206a fails, the other server 206b may pick up the I/O load of the failed server 206a to ensure that I/O is able to continue between the hosts 106 and the storage drives 204. This process may be referred to as a "failover."

In selected embodiments, each server 206 may include one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage drives 204. The servers 206 may host at least one instance of these software modules. These software modules may manage all read and write requests to logical volumes in the storage drives 204.

One example of a storage system 110a having an architecture similar to that illustrated in FIG. 2 is the IBM DS8000™ enterprise storage system. The DS8000™ is a high-performance, high-capacity storage controller providing disk and solid-state storage that is designed to support continuous operations. Nevertheless, the techniques disclosed herein are not limited to the IBM DS8000™ enterprise storage system 110a, but may be implemented in any comparable or analogous storage system 110, regardless of the manufacturer, product name, or components or component names associated with the system 110. Any storage system that could benefit from one or more embodiments of the invention is deemed to fall within the scope of the invention. Thus, the IBM DS8000™ is presented only by way of example and not limitation.

In certain embodiments, the storage drives 204 of the storage system 110a may be configured in one or more RAID arrays to provide desired levels of reliability and/or I/O performance. As previously mentioned, the most commonly utilized RAID levels are currently RAID-5 and RAID-6. These RAID levels utilize block-level striping with distributed parity values. A RAID-5 array is configured such that it can recover from a single drive failure, whereas a RAID-6 array can recover from two simultaneous drive failures. Thus, a RAID-6 array provides more robust and redundant data protection than a RAID-5 array.

In the field, it has been observed that a drive failure combined with a media error causes most incidents of data loss. For example, a drive failure in a RAID-5 array combined with a media error on another storage drive 204 in the same array will result in data loss. Although a RAID-5 array will also lose data when two storage drives 204 fail at the same time, data loss resulting from a single drive failure combined with a media error is the most common. A RAID-6 array, by contrast, will prevent data loss in either of the above-described scenarios due to the additional parity value that is utilized in a RAID-6 array. In view of the foregoing, systems and methods are needed to reduce incidents of data loss in redundant arrays of independent disks. Systems and methods are also needed to provide better reporting and statistics regarding data loss that results from a specific RAID level. Such systems and methods may, in certain cases, be used to encourage users to transition to a more robust RAID level (e.g., RAID-6), or provide evidence that a prior transition to a more robust RAID level has yielded benefits in terms of protecting data.

Figure 3:
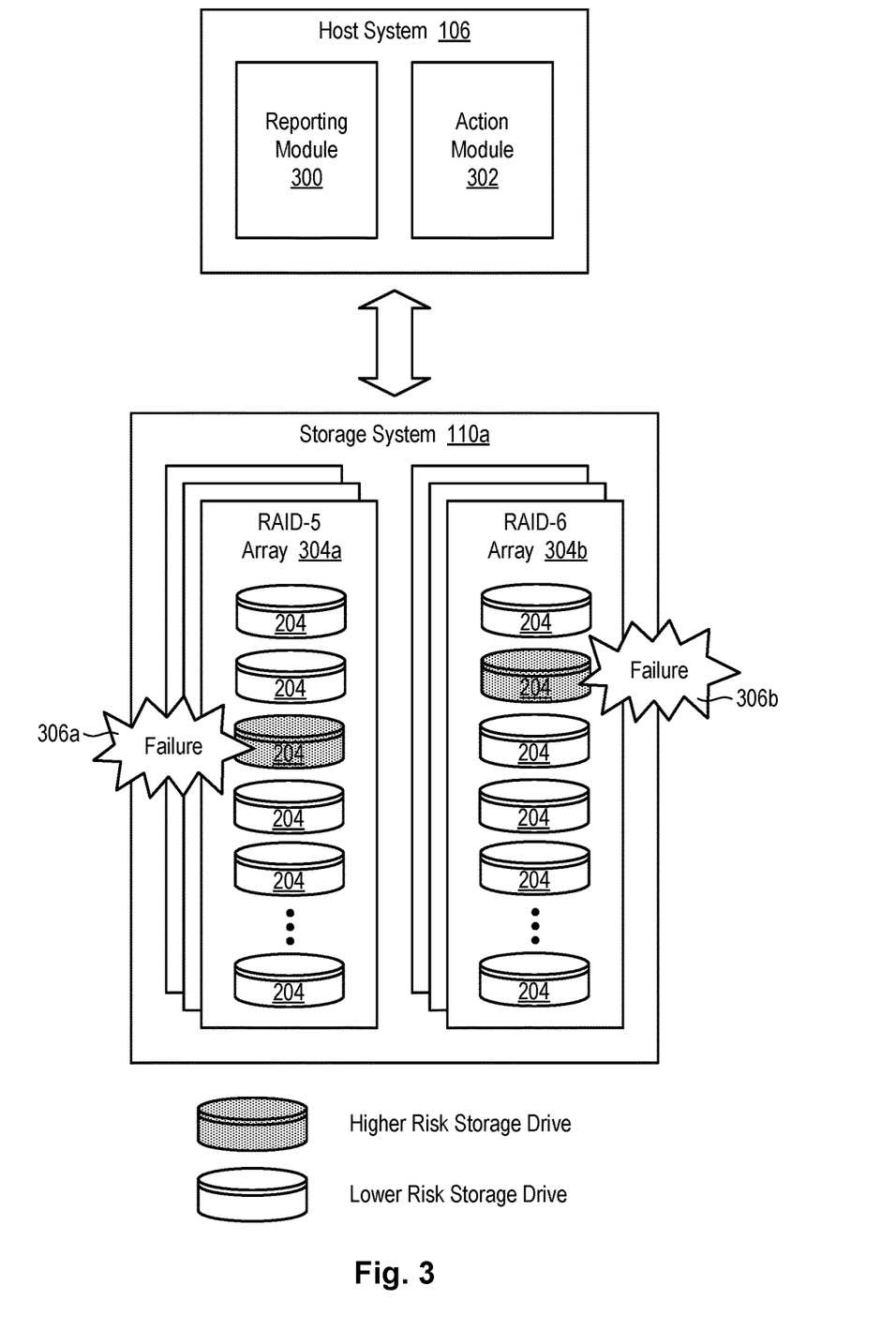
FIG. 3 shows a reporting module configured to report information associated with a storage drive failure in a storage environment, as well as optionally report whether certain data loss could have been prevented by using a RAID providing more robust data protection, or whether data loss was prevented by using a RAID providing more robust data protection.

Referring to FIG. 3, in certain embodiments in accordance with the invention, a reporting module 300 may be provided in a host system 102 or other system to reduce incidents of data loss in RAID arrays. This reporting module 300 may be configured to provide better reporting and statistics regarding data loss that results from a specific RAID level (e.g., a RAID-5 or RAID-6 array). The reporting and statistics provided by the reporting module 300 may, in certain embodiments, be used to encourage users to transition to a more robust RAID level (e.g., RAID-6), or provide evidence that a prior transition to a more robust RAID level has prevented data loss.

For example, as shown in FIG. 3, when a failure 306a (i.e., a storage drive failure 306a) occurs in a RAID-5 array 304a, the reporting module 300 may determine whether data loss occurred as a result of the failure. For example, if a failed storage drive 204 is accompanied by a media error on another storage drive 204 in the RAID-5 array 304a, data loss may result. In such a scenario, the reporting module 300 may document the failure 306a in the RAID-5 array 304a and the resulting data loss. The reporting module 300 may report this event to a user. In certain embodiments, the reporting module 300 may indicate whether the data loss could have been prevented had the RAID-5 array 304a been converted to a RAID-6 array 304b.

Similarly, in certain embodiments, when a failure 306b (i.e., a storage drive failure 306b) occurs in a RAID-6 array 304b, the reporting module 300 may determine whether data loss was prevented as a result of the RAID-6 architecture. For example, if a failed storage drive 204 is accompanied by a media error or another failed storage drive 204 but the RAID-6 array 304b was nevertheless able to recover, be rebuilt, and prevent data loss, the reporting module 300 may document this information. The reporting module 300 may report the event 306b to a user and indicate that the data loss was prevented because the RAID array was a RAID-6 array 304b, and possibly indicate that data loss would have occurred if the RAID array had been a RAID-5 array 304a.

The action module 302, by contrast, may take various actions to mitigate the risk of data loss in a storage environment comprising multiple RAID arrays 304. Examples of such actions will be discussed in association with FIGS. 5 through 7. FIG. 8 is a high-level block diagram showing the action module 302 and various associated sub-modules.

Figure 4:
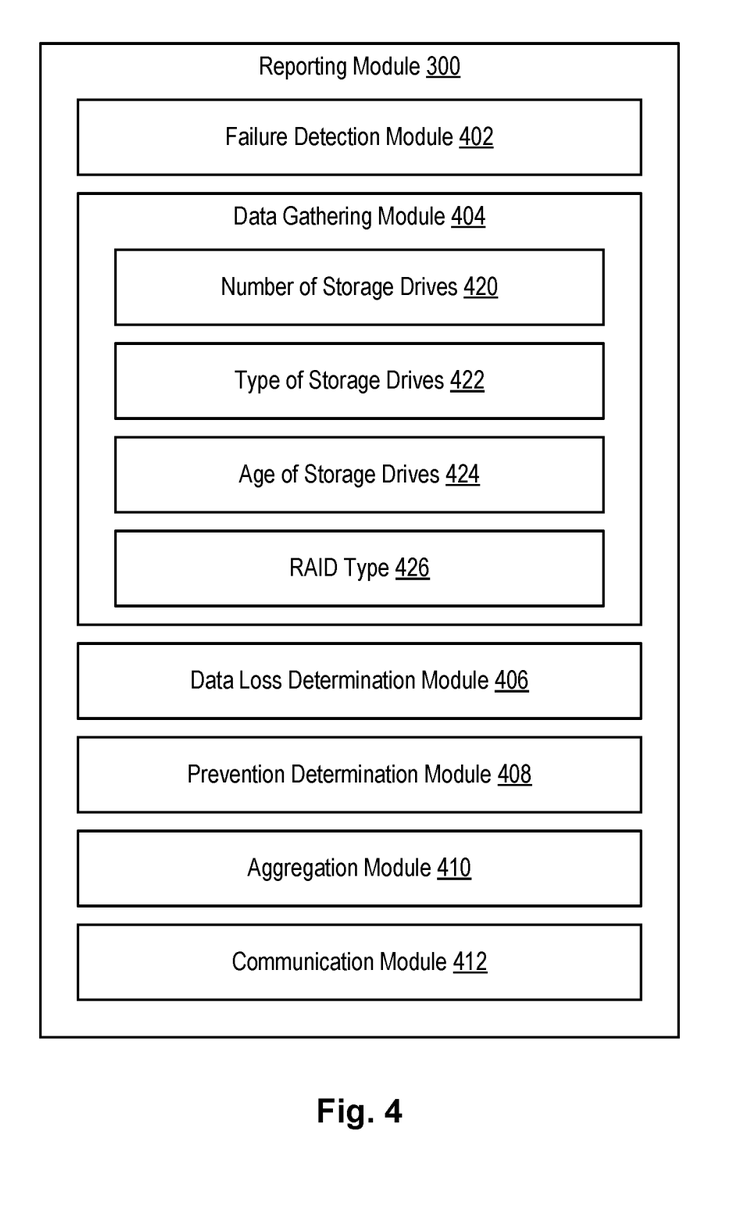
FIG. 4 is a high-level block diagram showing the reporting module and various associated sub-modules.

Referring to FIG. 4, a high-level block diagram showing a reporting module 300 and associated sub-modules is illustrated. The reporting module 300 and associated sub-modules may be implemented in hardware, software, firmware, or combinations thereof. The reporting module 300 and associated sub-modules are presented by way of example and not limitation. More or fewer sub-modules may be provided in different embodiments. For example, the functionality of some sub-modules may be combined into a single or smaller number of sub-modules, or the functionality of a single sub-module may be distributed across several sub-modules.

As shown, the reporting module 300 may include one or more of a failure detection module 402, data gathering module 404, data loss determination module 406, prevention determination module 408, aggregation module 410, and communication module 412.

The failure detection module 402 may be configured to detect a failure 306 in the storage system 110a, such as the failure 306 of one of more storage drives 204 participating in a RAID array 404. When such a failure 306 occurs, the data gathering module 404 may gather data about the failure 306. For example, the data gathering module 404 may determine the number 420 of storage drives 204 that failed, the type of storage drives 204 that failed (e.g., brand, model, storage capacity, performance characteristics, manufacturer specifications, etc.), the age of storage drives 204 that failed, and the RAID type (e.g., whether the RAID is a RAID-5 or RAID-6 array, for example) in which the failure 306 occurred.

The data loss determination module 406 may be configured to determine if the failure 306 resulted in data loss. For example, if a storage drive failure 306 was accompanied by a media error on another storage drive 204 or the failure 306 of another storage drive 204 in a RAID-5 array 304a, data may be lost. The data loss determination module 406 may determine whether such data loss occurred.

The prevention determination module 408, by contrast, may determine if the data loss detected by the data loss determination module 406 may have been prevented. For example, if data loss occurred in a RAID-5 array 304a would not have otherwise occurred had the RAID-5 array 304a been converted to a RAID-6 array 304b, the prevention determination module 408 may detect such a situation. Alternatively, or additionally, the prevention determination module 408 may determine whether the configuration of a RAID array 404 actually prevented data loss. For example, if a RAID-6 array 304b experienced a failure 306 that did not result in data loss, but would have resulted in data loss if the RAID array was a RAID-5 array 304a, the prevention determination module 408 may detect such a situation.

The aggregation module 410 may aggregate statistics across a storage environment and across RAID arrays 404. For example, the aggregation module 410 may, for each storage drive failure 306 that occurred in a storage environment, aggregate information such as the RAID type was involved (e.g., RAID-5, RAID-6, etc.), the number of storage drives 204 that failed, whether data loss was prevented or not, the storage drive types that failed, the age of the storage drives 204 that failed, and the like. In certain embodiments, the aggregation module 310 may aggregate information such as whether data loss that occurred in a RAID-5 array 304a could have been prevented had the RAID-5 array 304a been converted to a RAID-6 array 304b. Similarly, the aggregation module 410 may aggregate information such as whether a storage drive failure 306 that occurred in a RAID-6 array 304b and did not result in data loss, would have caused data loss had the failure occurred in a RAID-5 array 304a.

The communication module 412 may communicate the information generated and gathered by the other sub-modules 402, 404, 406, 408, 410 to a user. This may assist a user in determining how to configure a storage environment, and more particularly how to configure RAID arrays 404 in the storage environment. For example, the user may decide to convert various RAID-5 arrays 304a to RAID-6 arrays 304b upon seeing that use of RAID-6 arrays 304b would have prevented various incidents of data loss. Similarly, the information provided by the communication module 412 may validate a user's previous decision to convert RAID-5 arrays 304a to RAID-6 arrays 304b upon observing incidents of data loss that were prevented by the RAID-6 arrays 304b. In certain embodiments, this information may be used by vendors of storage services/hardware to convince customers to covert to or utilize RAID-6 arrays 304b by showing the customer real-world examples where data loss was avoided or would have been avoided by using RAID-6 arrays 304b.

Figure 5:
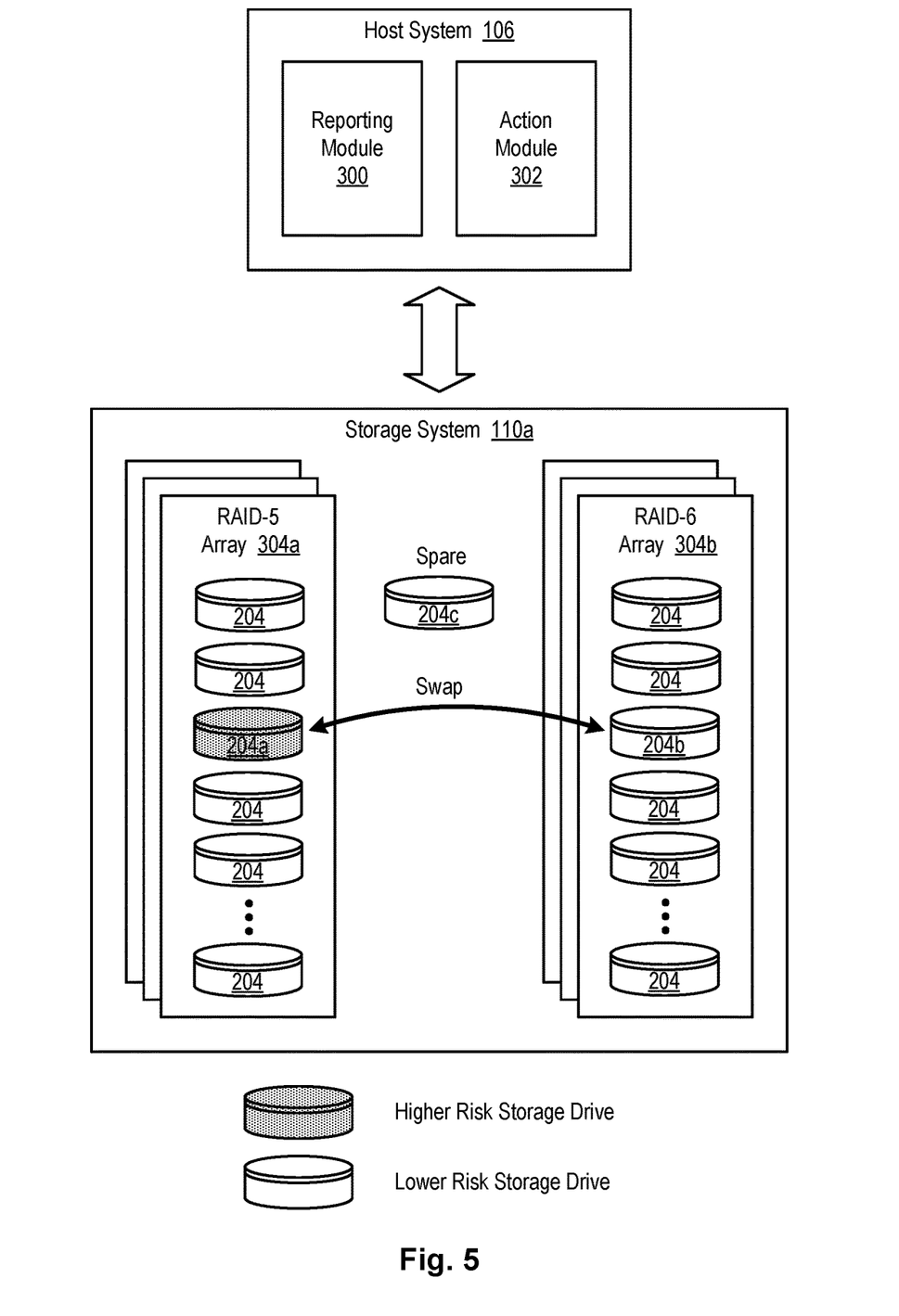
FIG. 5 shows an action module swapping storage drives between a RAID array providing less robust data protection and a RAID array providing more robust data protection in order to reduce the risk of data loss.

Referring to FIG. 5, as previously mentioned, the action module 302 may take various actions to mitigate the risk of data loss in a storage environment. In certain embodiments, the action module 302 may maintain statistics on storage drives 204 in the storage environment (e.g., a storage system 110a) in order to determine which storage drives 204 are at greatest risk of failure. For example, the action module 302 may determine how likely it is that a storage drive 204 will fail within a given time period (e.g., a month). In certain embodiments, this likelihood is expressed as a percentage chance that the storage drive 204 will fail in the given time period. The action module 302 may then determine which storage drives 204 have a risk of failure above a selected threshold (e.g., twenty-five percent) within the time period. These storage drives 204 may be designated as higher risk storage drives 204, as shown in FIG. 5. Storage drives 204 that are below the threshold may be designated as lower risk storage drives 204, as also shown in FIG. 5.

The action module 302 may then take actions to mitigate the risk of data loss in the storage environment, and more particularly within the particular RAID arrays 304 of the storage environment. In doing so, the action module 302 may take into account the RAID level of the RAID arrays 304. For example, a RAID-5 array 304a is less robust at protecting data than a RAID-6 array 304b. Thus, a higher risk storage drive 204 in a RAID-5 array 304a may be more likely to cause data loss than a higher risk storage drive 204 in a RAID-6 array 304b. Thus, the action module 302 may take actions to reduce or balance risk across the RAID arrays 304 in order to minimize the chance of data loss.

For example, as shown in FIG. 5, in certain embodiments, the action module 302 may analyze RAID arrays 304 in a storage environment to determine which RAID arrays 304 contain higher risk storage drives 204, as well as the number of higher risk storage drives 204 they contain. Using this information, the action module 302 may swap storage drives 204 between RAID-5 arrays 304a and RAID-6 arrays 304b in a way that reduces the risk of data loss and/or more evenly distributes the risk of data loss among the RAID arrays 304, taking into account their RAID level.

For example, FIG. 5 shows a RAID-5 array 304a that contains a higher risk storage drive 204a. Because the RAID-5 array 304a provides less robust data protection than the RAID-6 array 304b and can only survive a single storage drive failure without experiencing data loss, the action module 302 may swap the higher risk storage drive 204a in the RAID-5 array 304a with a lower risk storage drive 204b in the RAID-6 array 304b. This will result in a single higher risk storage drive 204a in the RAID-6 array 304b. As previously mentioned, the RAID-6 array 304b can recover from two simultaneous drive failures without incurring data loss, and thus is better able to handle the failure of the higher risk storage drive 204a.

When swapping storage drives 204 between RAID arrays 304, the action module 302 may do so in three steps using a spare storage drive 204c. For example, in the example of FIG. 5, the data in the higher risk storage drive 204a may be copied to the spare storage drive 204c and the spare storage drive 204c may then be incorporated into the RAID-5 array 304a to replace the higher risk storage drive 204a. The data in the lower risk storage drive 204b may then be copied to the higher risk storage drive 204a (which is now a spare) and the higher risk storage drive 204a may then be incorporated into the RAID-6 array 304b. The data in the storage drive 204c (which is now part of the RAID-5 array 304a) may then be copied to the lower risk storage drive 204b (which is now a spare) and the lower risk storage drive 204b may then be incorporated into the RAID-5 array 304a. This completes the swap of the higher risk storage drive 204a with the lower risk storage drive 204b.

In certain embodiments, a smart rebuild process may be used to copy data from one storage drive 204 to another. This smart rebuild process may reduce exposure to data loss by maintaining the ability for a storage drive 204 to be used as a spare even as data is being copied to it. In certain embodiments, when data is being copied from a first storage drive 204 to a second storage drive 204 (e.g., a spare storage drive 204), the smart rebuild process may create a bitmap for the first storage drive 204. Each bit may represent a section (e.g., a one megabyte region) of storage space on the first storage drive 204. The smart rebuild process may then begin copying data from the first storage drive 204 to the second storage drive 204. As each section is copied, its associated bit may be recorded in the bitmap.

If a write is received to a section of the first storage drive 204 while the data copy process is ongoing, the smart rebuild process may check the bitmap to determine if data in the associated section has already been copied to the second storage drive 204. If not, the smart rebuild process may simply write the data to the corresponding section of the first storage drive 204. Otherwise, after writing the data to the first storage drive 204, the data may also be copied to the second storage drive 204. Once all sections are copied from the first storage drive 204 to the second storage drive 204, the RAID array 300 may begin to use the second storage drive 204 in place of the first storage drive 204. This frees the first storage drive 204 from the RAID array 300.

Alternatively, the smart rebuild process may utilize a watermark instead of a bitmap to track which data has been copied from a first storage drive 204 to a second storage drive 204. In such an embodiment, sections may be copied in a designated order from a first storage drive 204 to a second storage drive 204. The watermark may track how far the copy process has progressed through the sections. If a write is received to a section of the first storage drive 204 during the copy process, the smart rebuild process may check the watermark to determine if data in the section has already been copied to the second storage drive 204. If not, the smart rebuild process may write the data to the first storage drive 204. Otherwise, after writing the data to the first storage drive 204, the smart rebuild process may also copy the data to the second storage drive 204. Once all sections have been copied from the first storage drive 204 to the second storage drive 204, the RAID array 300 may begin to use the second storage drive 204 in place of the first storage drive 204. This frees the first storage drive 204 from the RAID array 300.

Figure 6:
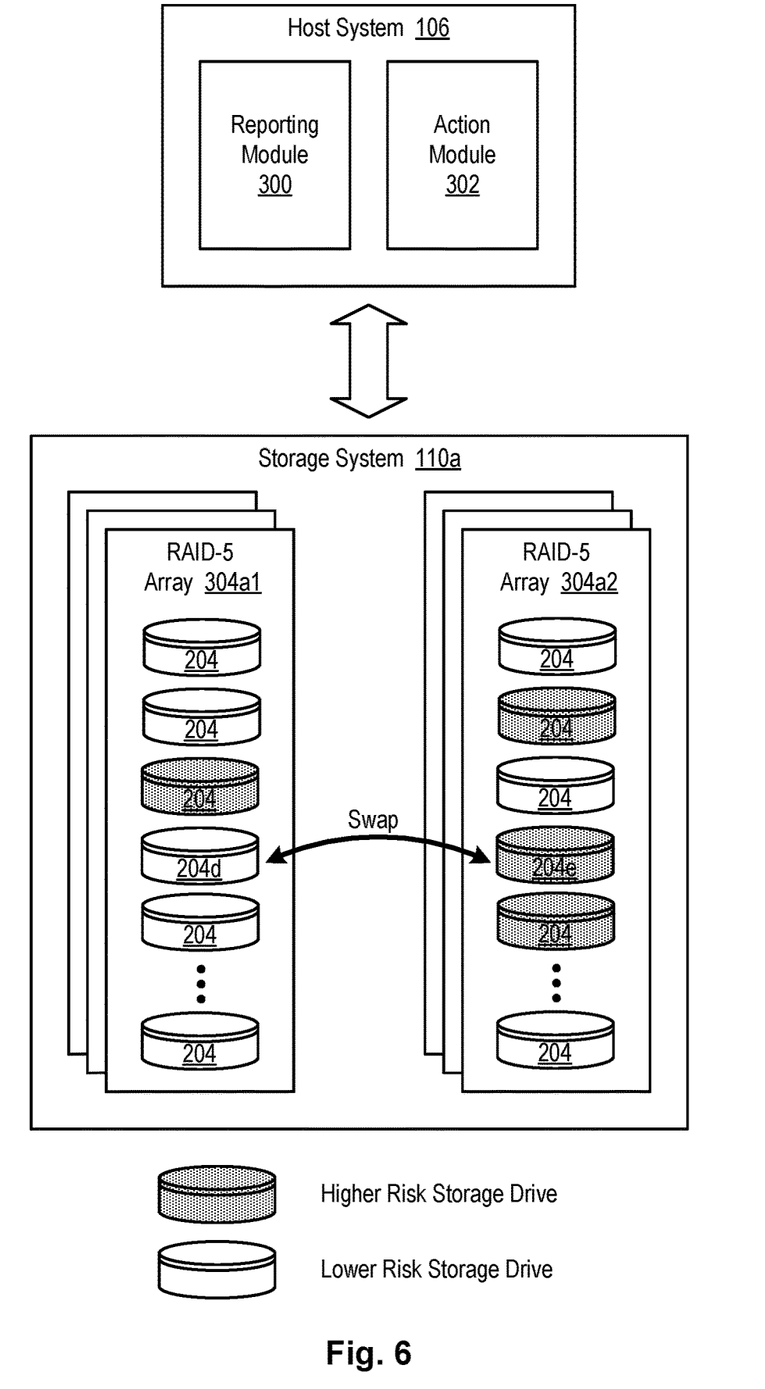
FIG. 6 shows the action module more evenly distributing higher risk storage drives across RAIDs of a certain RAID level in order to reduce the risk of data loss.

Referring to FIG. 6, in certain embodiments, the action module 302 may distribute higher risk storage drives 204 across RAID arrays 304 in a way that reduces the risk of data loss in a storage environment. For example, FIG. 6 shows two RAID-5 arrays 304a that each include a number of higher risk storage drives 204. In this example, the RAID-5 array 304a1 includes a single higher risk storage drive 204 and the RAID-5 array 304a2 includes three higher risk storage drives 204. To reduce the risk of data loss in the RAID-5 arrays 304a1, 304a2, the action module 302 may more evenly distribute the higher risk storage drives 204 across the RAID-5 arrays 304a by swapping a higher risk storage drive 204e from the RAID-5 array 304a2 with a lower risk storage drive 204d from the RAID-5 array 304a1. After the swap, each RAID-5 array 304a will contain two higher risk storage drives 204. Swapping may occur for RAID arrays 304 of the same RAID level, as shown in this example, and/or different RAID levels.

Figure 7:
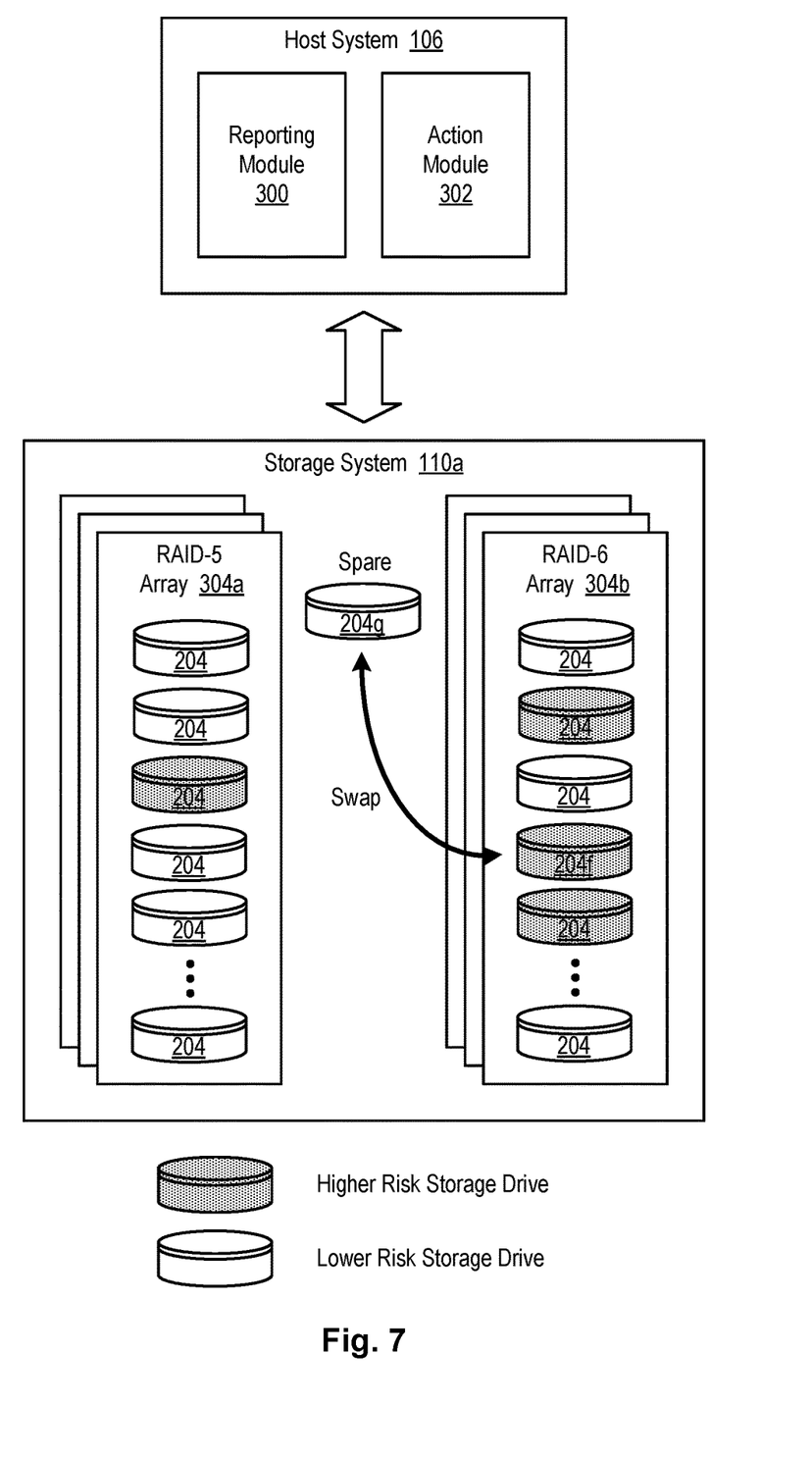
FIG. 7 shows the action module removing higher risk storage drives from RAID arrays in order to reduce the risk of data loss.
Figure 8:
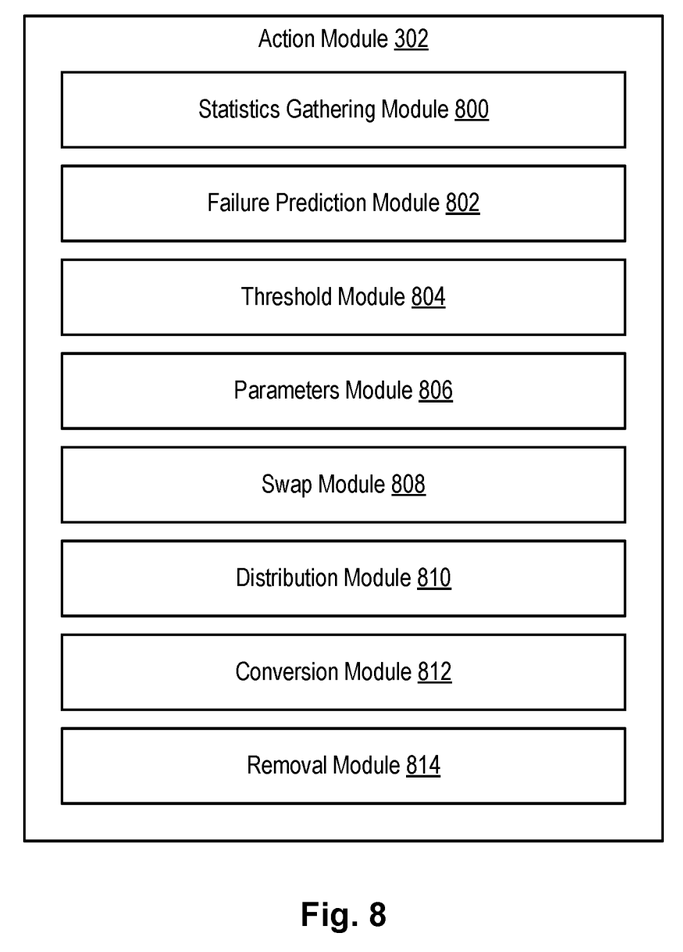
FIG. 8 is a high-level block diagram showing the action module and various associated sub-modules.

Referring to FIG. 7, in certain embodiments, if the risk of failure for a storage drive 204 exceeds a specified threshold (e.g., fifty percent) the action module 302 may simply remove the storage drive 204 from a RAID array 304 without placing it in another storage drive 204. To accomplish this, the action module 302 may swap the higher risk storage drive 204 with a spare storage drive 204. For example, as shown in FIG. 7, if the risk of failure of the higher risk storage drive 204f is above fifty percent, the action module 302 may copy the data from the higher risk storage drive 204f to the spare storage drive 204g and incorporate the spare storage drive 204g into the RAID array 304b. The higher risk storage drive 204f may then be tagged for replacement with a new spare storage drive 204.

Referring to FIG. 8, a high-level block diagram showing the action module 302 and associated sub-modules is illustrated. The action module 302 and associated sub-modules may be implemented in hardware, software, firmware, or combinations thereof. The action module 302 and associated sub-modules are presented by way of example and not limitation. More or fewer sub-modules may be provided in different embodiments. For example, the functionality of some sub-modules may be combined into a single or smaller number of sub-modules, or the functionality of a single sub-module may be distributed across several sub-modules.

As shown, the action module 302 includes one or more of a statistics gathering module 800, failure prediction module 802, threshold module 804, parameters module 806, swap module 808, distribution module 810, conversion module 812, and removal module 814.

The statistics gathering module 800 may be configured to gather statistics for storage drives 204 in the storage environment. For example, the statistics gathering module 800 may be configured to gather data such as the age of storage drives 204 in the storage environment, the type of storage drives 204 in the storage environment (e.g., brand, model, storage capacity, performance characteristics, etc.), the workload of storage drives 204, and/or the like. Using these statistics, the failure prediction module 802 may predict when storage drives 204 in the storage environment will fail. In certain embodiments, this is expressed as a percentage chance that a storage drive 204 will fail in a specified time period (e.g., one month). For example, the action module 302 may, using the statistics, determine that a storage drive 204 has a twenty-five percent chance of failing within a month.

The threshold module 804, by contrast, may designate a threshold wherein storage drives 204 are considered higher risk storage drives 204. For example, any storage drive 204 having a risk of failure exceeding twenty-five percent in the next month may be deemed a higher risk storage drive 204. The parameters module 806, by contrast, may establish various parameters associated with reducing the risk of data loss in storage environment. For example, the parameters may indicate that a RAID array 304 of a certain RAID level is not to contain more than a certain number of higher risk storage drives 204. For example, the parameters module 806 may indicate that a RAID-5 array 304a should contain zero higher risk storage drives 204, and a RAID-6 array 304b may contain up to two higher risk storage drives 204 due to its more robust data protection.

The action module 302 may then attempt to enforce the parameters. For example, the swap module 808 may attempt to swap storage drives 204 between RAID-5 arrays 304a and RAID-6 arrays 304b to reduce the risk of data loss in the storage environment. In certain cases, this may involve moving higher risk storage drives 204 from a RAID-5 array 304a to a RAID-6 array 304b and moving lower risk storage drives 204 from the RAID-6 array 304b to the RAID-5 array 304a. In certain embodiments, the swap module 808 may attempt to move all higher risk storage drives 204 from RAID-5 arrays 304a to RAID-6 arrays 304b. The distribution module 810, by contrast, may attempt to more evenly distribute higher risk storage drives 204 between RAID arrays 304 of a certain RAID level. For example, the distribution module 810 may attempt to more evenly spread higher risk storage drive 204 across RAID-5 arrays 304a assuming the higher risk storage drives 204 cannot be moved to RAID-6 arrays 304b.

In order to further reduce the risk of data loss in a storage environment, the conversion module 812 may be used to convert RAID arrays 304 from one RAID level to another. For example, if the risk of data loss is too high for a RAID-5 array 304a and the risk cannot be reduced in other ways, the conversion module 812 may convert the RAID-5 array 304a to a RAID-6 array 304b. Finally, if the risk of failure for a higher risk storage drive 204 is too high (e.g., above fifty percent), the removal module 814 may replace the higher risk storage drive 204 with a spare storage drive 204 and tag the higher risk storage drive 204 for removal from the storage environment.

Figure 9:
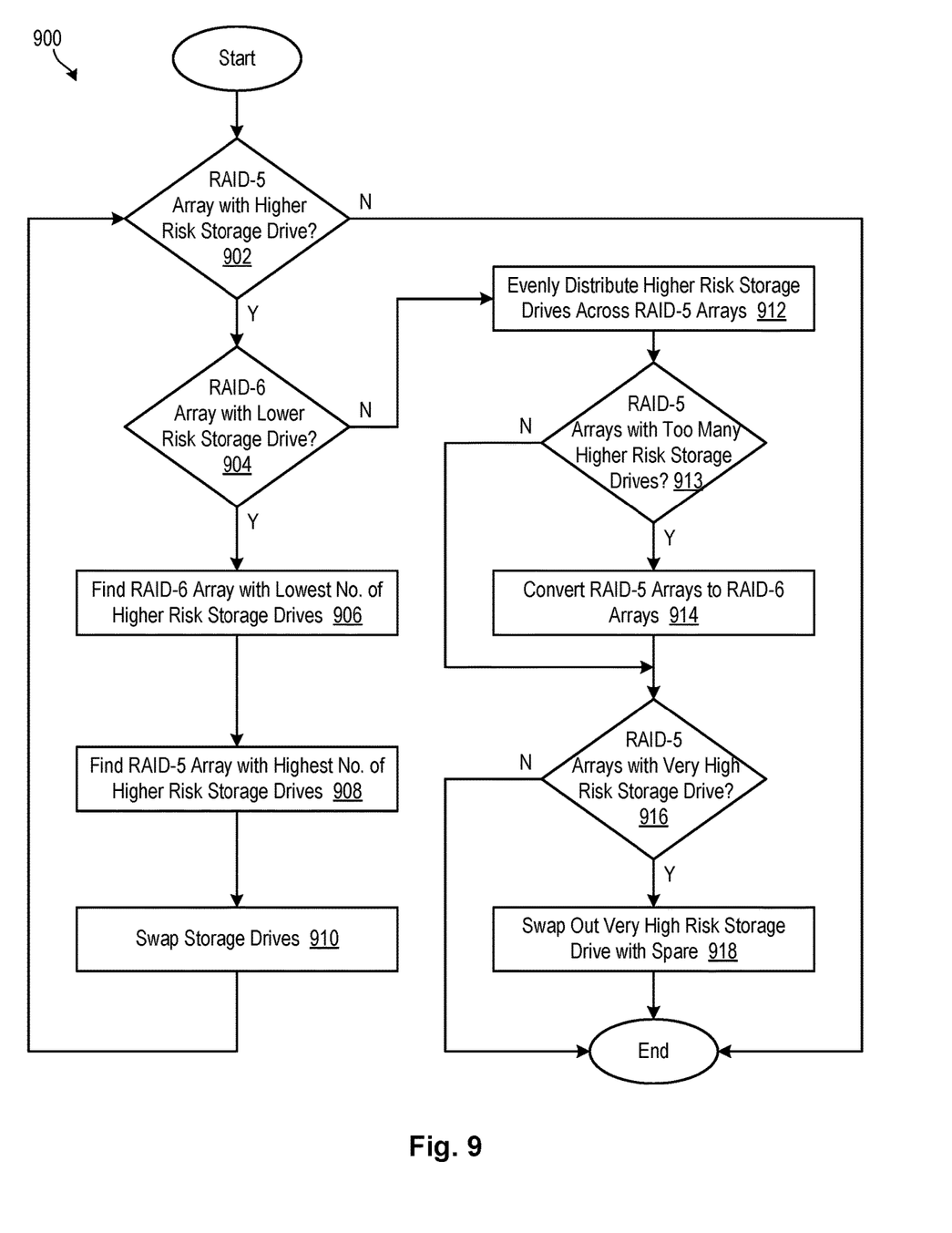
FIG. 9 is a flow diagram showing one embodiment of a method for reducing the risk of data loss in a storage environment comprising RAID arrays of different RAID levels.

FIG. 9 shows one embodiment of a method 900 for reducing the risk of data loss in a storage environment made up of RAID arrays of different RAID levels. Such a method 900 may, in certain embodiments, be executed by the action module 302 previously described. In this example, the storage environment includes a collection of RAID-5 arrays 304a and RAID-6 arrays 304b, although the method 900 may also be used with RAID arrays 304 of other RAID levels. The method 900 is simply one example of a methodology that may be executed by the action module 302 and is not intended to be limiting.

Once storage drives 204 are categorized as either higher risk storage drives 204 or lower risk storage drives 204, the method 900 may attempt to move storage drives 204 between RAID arrays 304 or perform other actions in order to reduce the risk of data loss in the storage environment. As shown, the method 900 initially determines 902 whether any RAID-5 arrays 304a in the storage environment contain higher risk storage drives 204 (e.g., storage drives 204 with a risk of failure above a certain percentage). If so, the method 900 determines 904 whether any RAID-6 arrays 304b in the storage environment contain lower risk storage drives 204. If so, the method 900 attempts to swap storage drives 204 between RAID arrays 304.

More specifically, the method 900 finds 906 a RAID-6 array 304b in the storage environment with the least number of higher risk storage drives 204. The method 900 also finds 908 a RAID-5 array 304a with the highest number of higher risk storage drives 204. The method 900 then swaps 910 a higher risk storage drive 204 in the RAID-5 array 304a with a lower risk storage drive 204 in the RAID-6 array 304b. The method 900 then repeats steps 902, 904, 906, 908, 910 until no RAID-5 array 304a in the storage environment contain any higher risk storage drives 204 or until no RAID-6 array 304b in the storage environment contains lower risk storage drives 204. If, at step 902, there are no more RAID-5 arrays 304a in the storage environment that contain higher risk storage drives 204, the method 900 ends.

If, on the other hand, the method 900 determines at step 904 that there are no more RAID-6 arrays 304b in the storage environment that contain lower risk storage drives 204 (they contain exclusively higher risk storage drives 204), the method 900 then attempts to distribute 912 higher risk storage drives 204 among the RAID-5 arrays 304a in the storage environment. That is, the method 900 attempts to more evenly distribute 912 higher risk storage drives 204 among the RAID-5 arrays 304a in the storage environment by swapping storage drives 204 between the RAID-5 arrays 304a. This may be performed to further reduce the risk of data loss in the storage environment.

After more evenly distributing 912 higher risk storage drives 204 among the RAID-5 arrays 304a, the method 900 may determine 913 whether there are still some RAID-5 arrays 304a that contain too many higher risk storage drives 204 (e.g., more than one). In such cases, the method 900 may convert 914 the RAID-5 arrays 304a to RAID-6 arrays 304b to reduce the risk of data loss. One embodiment of a method 1000 for determining whether a RAID array may be converted to a more robust RAID level is shown in FIG. 10.

Similarly, the method 900 may also determine 916 whether any RAID-5 arrays 304a in the storage environment contain very high risk storage drives 204 (e.g., storage drives 204 with a risk of failure above a high threshold). If so, the method 900 may swap 918 these very high risk storage drives 204 with spare storage drives 204. After performing these actions, the method 900 ends. The method 900 may be repeated periodically or in response to certain conditions to reduce/balance the risk of data loss in the storage environment.

Figure 10:
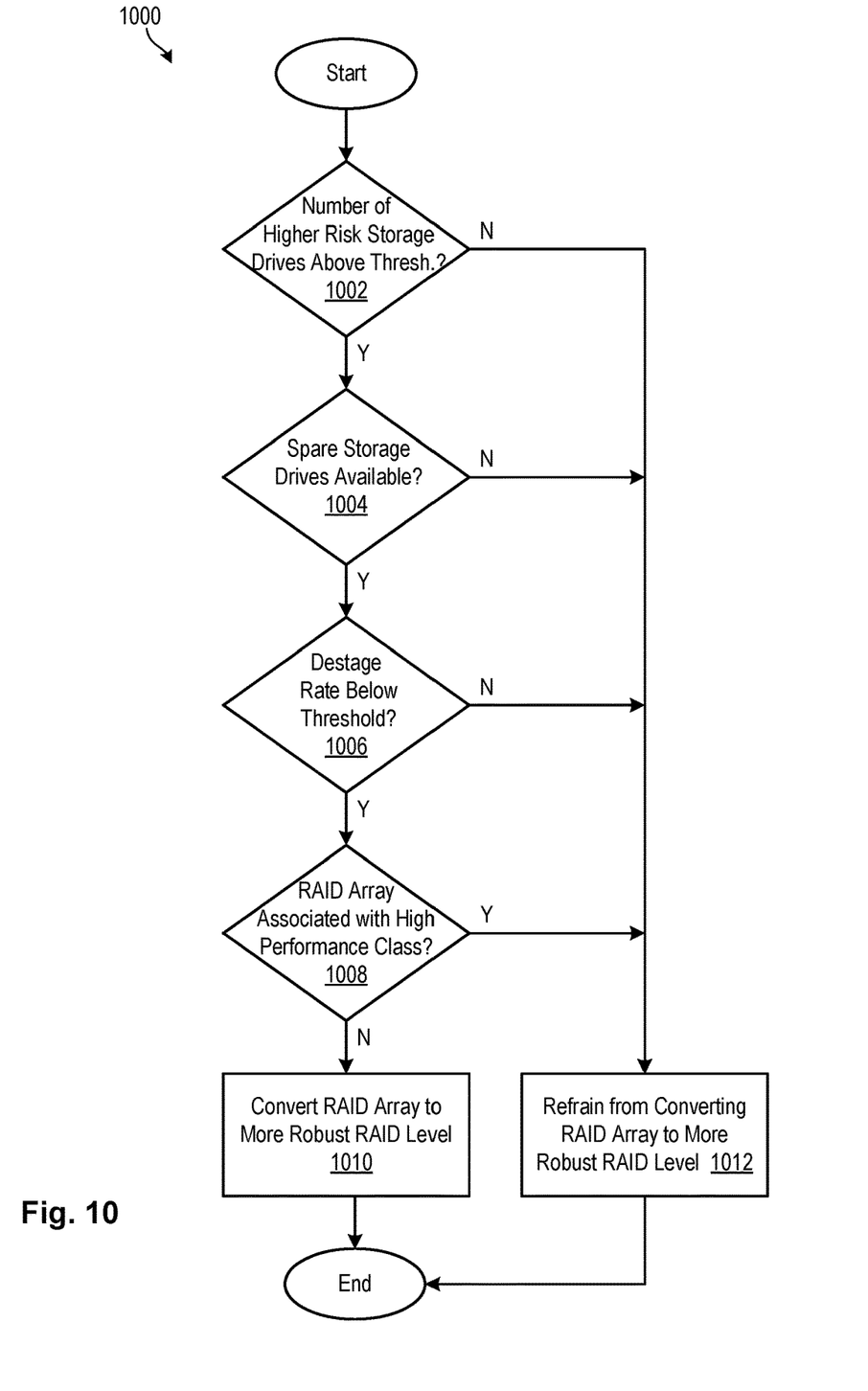
FIG. 10 is a flow diagram showing one embodiment of a method for determining whether a RAID array may be converted to a more robust RAID level.

FIG. 10 is a flow diagram showing one embodiment of a method 1000 for determining whether a RAID array 304 may be converted to a more robust RAID level (e.g., whether a RAID-5 array 304a may be converted to a RAID-6 array 304b). As shown, the method 1000 initially determines 1002 whether a number of higher risk storage drives 204 in a RAID array (e.g., RAID-5 array 304a) is above a threshold (e.g., one). If not, the method 1000 refrains 1012 from converting the RAID array 304 to a more robust RAID level.

If, at step 1002, the number of higher risk storage drives 204 in the RAID array 304 is above the threshold, the method 1000 determines 1004 whether the storage environment contains a sufficient number of spare storage drives 204 of the type that are used in the RAID array 304. If not, the method 1000 may not be able to convert the RAID array 304 to a more robust RAID level and thus refrains 1012 from doing do.

If, at step 1004, the storage environment contains a sufficient number of spare storage drives 204 to convert the RAID array 304 to a more robust RAID level, the method 1000 may check for additional criteria. For example, assuming the RAID array 304 is a RAID-5 array 304a and the more robust RAID level is RAID-6, the method 1000 may determine 1006 whether a destage rate to the RAID-5 array 304a is below a threshold (e.g., 500K I/O operations per second). The destage rate may, in certain embodiments, refer to the rate that data is destaged from cache (in memory 214) to the RAID array 304. In general, destages to a RAID-5 array 304a are more efficient than destages to a RAID-6 array 304b since a destage to a RAID-5 array 304a requires four operations (1. staging the data, 2. staging the parity value, 3. destaging the data, and 4. destaging the parity value) whereas a destage to a RAID-6 array 304b requires six operations (1. staging the data, 2. staging the first parity value, 3. staging the second parity value, 4. destaging the data, 5. destaging the first parity value, and 6. destaging the second parity value). Thus, if the destage rate associated with a RAID-5 array 304a is high, converting the RAID-5 array 304a to a RAID-6 array 304b may negatively impact the performance of the RAID array. Thus, in certain embodiments, if the destage rate to a RAID-5 array 304a is above a selected threshold, the method 1000 may refrain 1012 from converting the RAID-5 array 304a to a RAID-6 array 304b.

If, at step 1006, the destage rate to the RAID array 304 is below the threshold, the method 1000 determines 1008 whether the RAID array 304 is associated with a high performance class. Such a high performance class may be associated with high performance data. As mentioned above, destages to a RAID-6 array 304b may be less efficient than destages to a RAID-5 array 304a. Thus, converting a RAID-5 array 304a to a RAID-6 array 304b may impair I/O performance to data on the RAID-5 array 304a particularly if the data is high performance data. Thus, in certain embodiments, if a RAID array 304 is associated with a high performance class, the method 1000 may refrain 1012 from converting the RAID array 304 to a more robust RAID level.

In the illustrated embodiment, if each of the criteria 1002, 1004, 1006, 1008 are satisfied, the method 1000 converts 1010 the RAID array 304 to more robust RAID level, such as converting a RAID-5 array 304a to a RAID-6 array 304b. The illustrated criteria are presented simply by way of example and not limitation. In other embodiments, the method 1000 may include fewer, additional, or different criteria to determine if and when to convert a RAID array of a certain RAID level to a more robust RAID level.

The systems and methods disclosed herein have been discussed primarily in association with reducing the risk of data loss in a storage environment made up of RAID-5 and RAID-6 arrays 304. Nevertheless, the systems and methods disclosed herein are not limited to RAID-5 and RAID-6 arrays 304, but may also be used with RAID arrays 304 having other RAID levels (e.g., RAID-10 arrays). Thus, the systems and methods disclosed herein are not limited to RAID-5 and RAID-6 arrays 304.

The flowcharts and/or block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for converting a redundant array of independent disks (RAID) to a more robust RAID level, the method comprising:
    identifying, in a data storage environment, higher risk storage drives having a failure risk above a first threshold;
    determining a number of the higher risk storage drives that are contained within a RAID array of the data storage environment;
    determining whether the number exceeds a second threshold; determining whether a destage rate associated with the RAID array is below a third threshold, the destage rate indicating a rate at which data is destaged from a cache to the RAID array; and
    upon determining that the number exceeds the second threshold and the destage rate is below the third threshold, converting the RAID array to a more robust RAID level.

2. The method of claim 1, wherein the RAID array is a RAID-5 array.

3. The method of claim 2, wherein converting the RAID array to a more robust RAID level comprises converting the RAID-5 array to a RAID-6 array.

4. The method of claim 1, further comprising determining whether the RAID array is associated with a high performance class.

5. The method of claim 4, further comprising only converting the RAID array to the more robust RAID level if the RAID array is not associated with the high performance class.

6. The method of claim 1, further comprising determining whether the data storage environment contains a sufficient number of spare storage drives to convert the RAID array to a more robust RAID level.

7. The method of claim 6, further comprising only converting the RAID array to the more robust RAID level if the data storage environment contains the sufficient number of spare storage drives.

8. A computer program product for converting a redundant array of independent disks (RAID) to a more robust RAID level, the computer program product comprising a computer-readable storage medium having computer-usable program code embodied therein, the computer-usable program code configured to perform the following when executed by at least one processor:
- identify, in a data storage environment, higher risk storage drives having a failure risk above a first threshold;
- determine a number of the higher risk storage drives that are contained within a RAID array of the data storage environment; determine whether the number exceeds a second threshold;
- determine whether a destage rate associated with the RAID array is below a third threshold, the destage rate indicating a rate at which data is destaged from a cache to the RAID array; and
- upon determining that the number exceeds the second threshold and the destage rate is below the third threshold, convert the RAID array to a more robust RAID level.

9. The computer program product of claim 8, wherein the RAID array is a RAID-5 array.

10. The computer program product of claim 9, wherein converting the RAID array to a more robust RAID level comprises converting the RAID-5 array to a RAID-6 array.

11. The computer program product of claim 8, wherein the computer-usable program code is further configured to determine whether the RAID array is associated with a high performance class.

12. The computer program product of claim 11, wherein the computer-usable program code is further configured to only convert the RAID array to the more robust RAID level if the RAID array is not associated with the high performance class.

13. The computer program product of claim 8, wherein the computer-usable program code is further configured to determine whether the data storage environment contains a sufficient number of spare storage drives to convert the RAID array to a more robust RAID level.

14. The computer program product of claim 13, wherein the computer-usable program code is further configured to only convert the RAID array to the more robust RAID level if the data storage environment contains the sufficient number of spare storage drives.

15. A system for converting a redundant array of independent disks (RAID) to a more robust RAID level, the system comprising:
- at least one processor;
- at least one memory device coupled to the at least one processor and storing instructions for execution on the at least one processor, the instructions causing the at least one processor to:
- identify, in a data storage environment, higher risk storage drives having a failure risk above a first threshold;
- determine a number of the higher risk storage drives that are contained within a RAID array of the data storage environment;
- determine whether the number exceeds a second threshold;
- determine whether a destage rate associated with the RAID array is below a third threshold, the destage rate indicating a rate at which data is destaged from a cache to the RAID array; and
- upon determining that the number exceeds the second threshold and the destage rate is below the third threshold, convert the RAID array to a more robust RAID level.

16. The system of claim 15, wherein the RAID array is a RAID-5 array.

17. The system of claim 16, wherein converting the RAID array to a more robust RAID level comprises converting the RAID-5 array to a RAID-6 array.

18. The system of claim 15, wherein the instructions further cause the at least one processor to determine whether the RAID array is associated with a high performance class.

19. The system of claim 18, wherein the instructions further cause the at least one processor to only convert the RAID array to the more robust RAID level if the RAID array is not associated with the high performance class.

20. The system of claim 15, wherein the instructions further cause the at least one processor to only convert the RAID array to the more robust RAID level if the data storage environment contains a sufficient number of spare storage drives.

* * * * *